(12) United States Patent
Elliott

(10) Patent No.: US 8,407,327 B1
(45) Date of Patent: Mar. 26, 2013

(54) NETWORK MANAGEMENT USING VISUAL IDENTIFIERS

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 2556 days.

(21) Appl. No.: 11/087,231

(22) Filed: Mar. 23, 2005

Related U.S. Application Data

(60) Provisional application No. 60/556,123, filed on Mar. 25, 2004.

(51) Int. Cl.
*G06F 15/16* (2006.01)
*G06F 15/173* (2006.01)

(52) U.S. Cl. ........ 709/223; 709/204; 709/206; 709/207; 709/224; 709/217; 709/218; 340/870.02; 340/870.01; 340/870.07; 340/870.2; 340/870.28; 340/539.32; 340/573.1; 375/132; 370/238; 705/412; 705/2; 705/26.8; 705/28; 379/106.03

(58) Field of Classification Search ............... 709/223, 709/204, 206–207, 217, 218, 219, 224; 340/870.02, 340/870.03, 870.01, 870.07, 870.2, 870.28, 340/573.1, 539.32; 375/132; 370/238; 705/412; 379/106.03

See application file for complete search history.

(56) References Cited

U.S. PATENT DOCUMENTS

| | | | |
|---|---|---|---|
| 6,088,659 A * | 7/2000 | Kelley et al. ................... 702/62 |
| 6,363,057 B1 * | 3/2002 | Ardalan et al. ............... 370/252 |
| 6,396,839 B1 * | 5/2002 | Ardalan et al. ............... 370/401 |
| 6,657,552 B2 * | 12/2003 | Belski et al. ............. 340/870.02 |
| 6,747,571 B2 * | 6/2004 | Fierro et al. ............. 340/870.02 |
| 6,747,733 B2 * | 6/2004 | Shirai et al. ..................... 356/5.1 |
| 6,754,904 B1 * | 6/2004 | Cooper et al. .................. 725/32 |
| 6,889,219 B2 * | 5/2005 | Epstein et al. .................. 706/45 |
| 7,061,924 B1 * | 6/2006 | Durrant et al. ................ 370/401 |
| 7,304,587 B2 * | 12/2007 | Boaz ........................ 340/870.02 |
| 2002/0109607 A1 * | 8/2002 | Cumeralto et al. ...... 340/870.02 |
| 2003/0128134 A1 * | 7/2003 | Fierro et al. ............. 340/870.02 |
| 2005/0270173 A1 * | 12/2005 | Boaz ........................ 340/870.02 |
| 2006/0204399 A1 * | 9/2006 | Freeman et al. ................. 422/58 |

* cited by examiner

*Primary Examiner* — John Follansbee
*Assistant Examiner* — Saket K Daftuar

(57) ABSTRACT

This disclosure relates to network management using visual identifiers. In one of many possible embodiments, a network management system includes a visual identifier device located visibly proximate to a network device. The visual identifier device includes a set of visual identifiers and a selector mechanism configured to be manipulated to select at least one of the visual identifiers to be assigned to the network device. The network management system also includes a display device configured to display a visual representation of said selected visual identifier.

26 Claims, 5 Drawing Sheets

NETWORK MANAGEMENT USING VISUAL IDENTIFIERS

RELATED APPLICATION

This application claims priority under 35 U.S.C. §119(e) to U.S. Provisional Patent Application Ser. No. 60/556,123, by Brig Barnum Elliott, filed on Mar. 25, 2004, and entitled SIMPLE MANAGEMENT FOR SMALL NETWORKS, the contents of which are hereby incorporated by reference in their entirety.

FIELD

This disclosure relates to network management using visual identifiers.

BACKGROUND OF THE INVENTION

Communication networks typically include network devices configured to communicate with each other by sending messages over links. Each device of a network is assigned an address (e.g., an Internet protocol ["IP"] address), which is used to identify the device within the network. When a device is added to a network, a network operator typically assigns the device an address that is distinct within the network.

With conventional network management techniques, it is somewhat inconvenient to introduce a new device into a network because a network operator must choose and assign a unique address. The network operator often must select an address and take the time to verify that the selected address is not already assigned to another network device.

Once addresses are assigned to network devices, network operators use the addresses to locate the devices for purposes of network management and maintenance. For example, if a network device encounters a problem (e.g., power failure), the network operator may be notified of the failure and be provided the address of the particular device that failed. The network operator will then use the address assigned to the device to locate and service the device.

Unfortunately, addresses of network devices typically come in formats that are not conducive for locating the devices in a network. This is especially true for networks that include identical or similar devices (e.g., printers of the same model). To illustrate, when a network operator receives notification of a network problem, the address corresponding to the problem device is usually provided to the network operator. This may be accomplished by displaying the address of the problem device on a computer screen used by the network operator. However, it is not easy for the network operator to associate traditional addresses shown on a display with the actual physical devices of a network, particularly when numeric IP addresses are used to identify the devices. Because of the inconvenience of traditional addressing schemes, many network operators have resorted to physically writing the addresses on network devices. For example, it is not uncommon to see IP addresses scribbled on the housings of network devices such as printers and workstations.

In sum, conventional network addressing schemes inconvenience network operators by requiring them to select and assign unique addresses to a device upon its introduction to a network. Moreover, network operators are often forced to physically locate a problem device by manually inspecting many devices for signs of the problem. Clearly, such addressing schemes are inconvenient and may also be prone to cause error.

SUMMARY OF THE INVENTION

This disclosure relates to network management using visual identifiers. In one of many possible embodiments, a network management system includes a visual identifier device located visibly proximate to a network device. The visual identifier device includes a set of visual identifiers and a selector mechanism configured to be manipulated to select at least one of the visual identifiers to be assigned to the network device. The network management system also includes a display device configured to display a visual representation of the selected visual identifier. In some embodiments, the visual identifiers are in the form of different colors or other distinguishable images.

In another embodiment, a method of introducing a network device into a network is provided. In the method, a visual identifier device is provided. The visual identifier device offers a set of visual identifiers from which one of the visual identifiers may be selected to be assigned to the network device. The selected visual identifier is recognized and associated with the network device. It is determined whether the selected visual identifier is already in use by another network device of the network, and a failure notification is provided along with an opportunity to select another one of the visual identifiers if it is determined that the selected visual identifier is already in use. In some embodiments, a success notification is provided to the network operator if it is determined that the selected visual identifier is available. In some embodiments, a visual representation of the selected visual identifier is displayed on a network management display.

The present disclosure will be more fully understood upon reading the following detailed description in conjunction with the accompanying drawings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION

I. Overview

Systems, methods, and apparatuses for network management are disclosed. More specifically, the systems, methods, and apparatuses (collectively the "system") provide for network management using visual identifiers. The visual identifiers may be associated with network devices to enable network operators to easily and conveniently locate network devices by using the visual identifiers.

Visual identifier devices are provided that allow network operators to conveniently select and map visual identifiers to network devices. For example, a visual identifier device may be connected to, or located near to, a particular network device. The visual identifier includes multiple visual identifiers from which a network operator may select a particular visual identifier to be assigned to the particular network device. Upon selection, the visual identifier device may validate the selected visual identifier to ensure that it is not already being used to identify a different network device.

Once a valid visual identifier has been selected, the visual identifier device is able to make information representative of the selected visual identifier available to a network management application for use in managing the network. A representation of the visual image may be displayed for viewing by network operators. The visual identifier is useful for quickly and conveniently associating displayed information about a network device with the location of the actual network device. Accordingly, network operators are able to quickly and conveniently use the visual identifiers to locate the physical network devices identified by the visual identifiers. Moreover, the visual identifier devices make it convenient to introduce new network devices to the network, as discussed below.

II. Introduction of Elements

Figure 1:
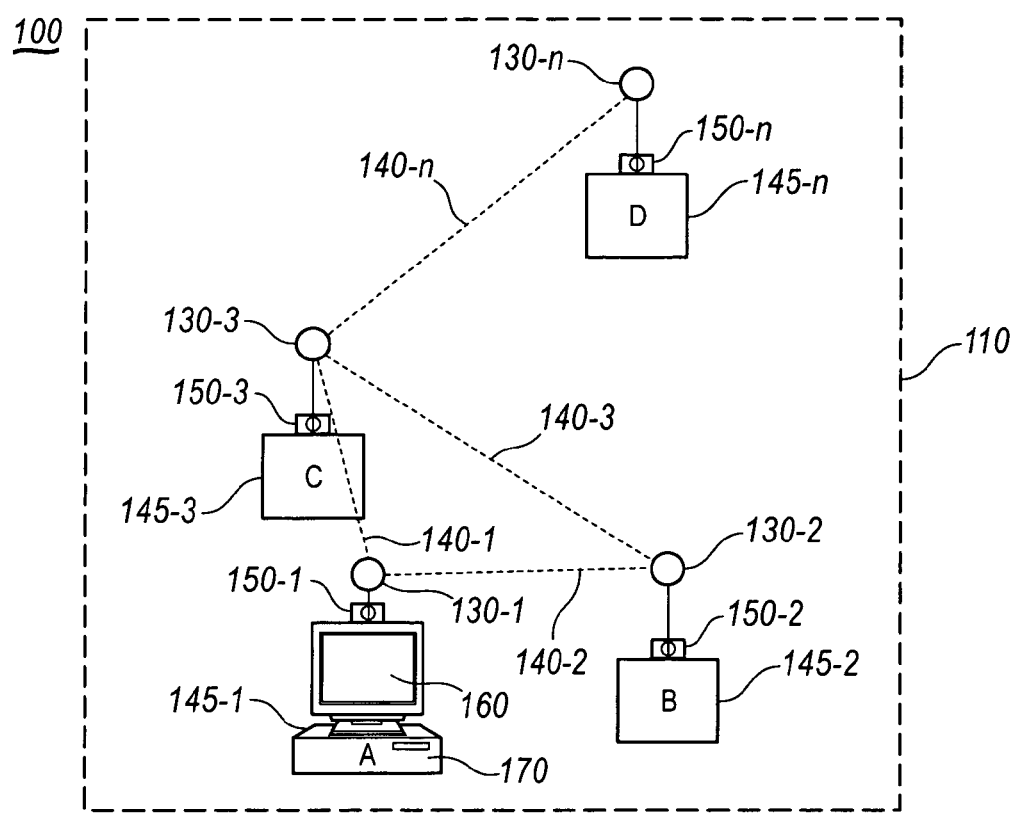
FIG. 1 is a block diagram illustrating an example of a network management system, according to one embodiment.

The present systems, methods, and apparatuses may be implemented in any suitable network. FIG. 1 is a block diagram illustrating an example of a network management system 100 implemented in an exemplary network 110, according to one embodiment. The system 100 may be implemented using a variety of hardware approaches known to those of ordinary skill in the art, and the instructions for implementation may be stored using a computer-readable medium or media. The instructions may be in the form of software and/or firmware applications, or in any other suitable form.

As shown in FIG. 1, the network 110 may include nodes 130-1 through 130-*n* (collectively "the nodes 130") connected by links 140-1 through 140-*n* (collectively "the links 140"). The nodes 130 are configured to transmit messages (e.g., packets) over the links 140. The messages may be transmitted using known or not yet developed network communication technology. In FIG. 1, the nodes 130 are connected to, or otherwise associated with, network devices 145-1 through 145-*n* (collectively "the network devices 145") and visual identifier devices 150-1 through 150-*n* (collectively "the visual identifier devices 150"). As shown in FIG. 1, each of the network devices 145 may be associated with one of the visual identifier devices 150. One or more of the network devices 145 may include a display device 160 and a network management application 170 configured to display network information to network operators.

While an exemplary implementation of the system 100 is shown in FIG. 1, those skilled in the art will recognize that the exemplary components illustrated in the Figure are for purposes of illustration and not intended to be limiting. Indeed, those skilled in the art will recognize that other alternative network environments may be used in other embodiments. Each element shown in FIG. 1 will now be discussed in greater detail.

A. Network

The network 110 may be in the form of a wide variety of different types and/or configurations of networks, including network types and configurations known to those of ordinary skill in the art. The network 110 may be of any size having any number of nodes 130. However, in some embodiments, it is preferable that the network 110 is relatively small, such as the size of a home or small-business network 110. The network 110 may employ any suitable technology or technologies (e.g., routing technologies) that enable transmission of messages between the nodes 130.

B. Links

The network 110 may use any known or not yet developed communication medium or media for the transmission of messages between the nodes 130. For example, the links 140 may comprise any known medium or media capable of carrying messages between the nodes 130 of the network 110. The links 140 may be in the form of wireless connections, including, but not limited to radio frequency connections (e.g., cellular connections), infrared connections, or any other known type of wireless connection. The links 140 may be in the form of non-wireless connections such as telephone lines, cable lines, fiber lines, etc.

The links 140 may support use of any suitable transmission protocol. For example, the links 140 may be capable of supporting wireless fidelity ("WiFi") connections conforming to 802.11b protocol and/or Ethernet protocol connections, which are well known to those skilled in the art.

C. Nodes

The nodes 130 include connections to the links 140 of the network 110 and configured to provide an interface between the network devices 145 and the links 140. Through the nodes 130, the network devices 145 and the visual identifier devices 150 are able to send and receive messages over the network 110.

The nodes 130 may include any network interface known to those of ordinary skill in the art. The nodes 130 may be external of the network devices 145 and the visual identifier devices 150, or the nodes 130 may be integrated as part of the network devices 145 and/or the visual identifier devices 150.

D. Network Devices

The network devices 145 may comprise any device or devices capable of communicating over the links 140. In other words, the network devices 145 may include any device having networking capability. The devices 145 may be in the form of routers, switches, gateways, general computers, dedicated computers, workstations, personal digital assistants, cellular telephones, cellular pagers, satellite telephones, satellite pagers, e-mail devices, network interface cards, printers, scanners, cameras, actuators, door bells, locks, vehicles, and any other device having networking capability. The network devices 145 may also be in the form of network-capable sensors (e.g., wireless sensors) such as smoke detectors, thermostats, pressure sensors, motion detectors, light sensors, security sensors, electrical sensors, chemical sensors, or other similar devices.

Further, the network devices 145 may include any hardware, firmware, and/or software useful for implementing and operating the system 100. For example, one or more of the network devices 145 may include the display device 160 and application software such as the network management application 170 for presenting visual representations to network operators, as discussed below. In FIG. 1, network device 145-1 (also depicted as "A") is in the form of a computer including the display device 160. The network device 145-1 may further include the network management application 170. Together, the display device 160 and the network management application 170 are configured to display information about the network devices 145 for viewing by network operators. In particular, representations of visual identifiers associated with the network devices 145 may be displayed, as discussed below.

In FIG. 1, network devices 145-2 through 145-n (also depicted as "B," "C," and "D," respectively) may be in the form of sensors, such as smoke detectors. While FIG. 1 shows an exemplary configuration of network devices 145, many other configurations and types of network devices 145 may be implemented in the system 100.

E. Visual Identifier Devices

As shown in FIG. 1, each of the visual identifier devices 150 may be associated with one of the network devices 145. The association may be implemented in a wide variety of ways. For example, the visual identifier devices 150 may be integrated as part of the network devices 145. Alternatively, the visual identifier devices 150 may instead be located external of and be communicatively coupled to the network devices 145 using any known technology, including wireless technologies such as Bluetooth. Preferably, the visual identifier devices 150 are located proximate to the network devices 145 and are easily viewable by network operators.

Figure 2:
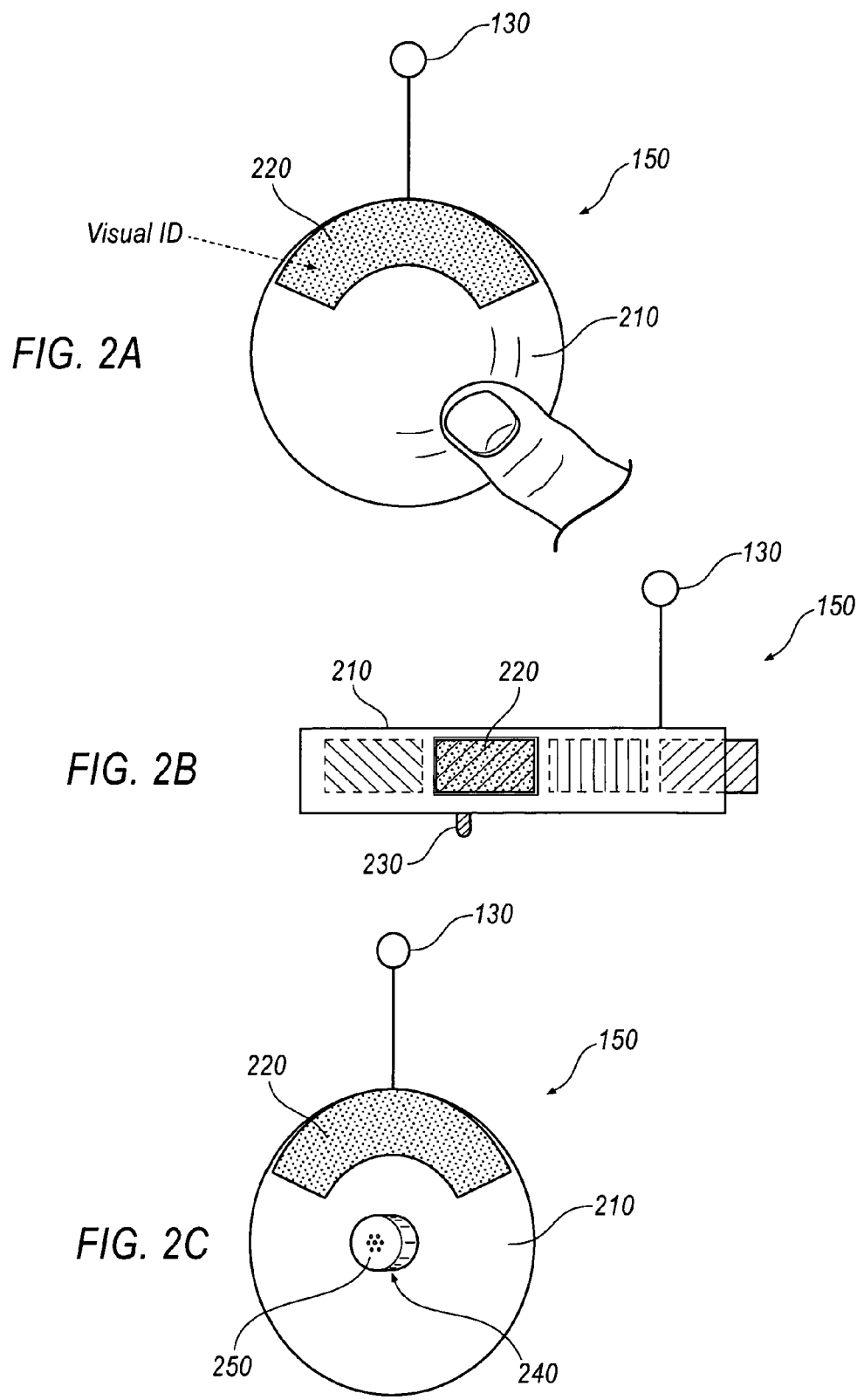
FIG. 2A is a schematic diagram illustrating the visual identifier device of the system of FIG. 1, according to one embodiment.
FIG. 2B is a schematic diagram illustrating another embodiment of the visual identifier device of the system of FIG. 1.
FIG. 2C is a schematic diagram illustrating yet another embodiment of the visual identifier device of the system of FIG. 1.

FIGS. 2A through 2C illustrate various embodiments of the visual identifier device 150. Of course, the visual identifier device 150 is not limited to the embodiments shown in these Figures. With reference to FIG. 2A, the visual identifier device 150 is connected to, or at least located proximate to, a node 130 of the network 110. Alternatively, the visual identifier device 150 may be formed integral to one or more nodes 130 of the network 110.

The visual identifier device 150 includes a housing 210 configured to be manipulated to allow for a visual identifier 220 to be selected. The housing 210 may be configured as any apparatus that allows for the visual identifier 220 to be conveniently selected on the visual identifier device 150. For example, the housing 210 may be configured as a thumbwheel, a slider or sliding selector, or a knobbed housing for turning to the visual identifier 220, as shown in FIGS. 2A through 2C, respectively.

For the embodiment shown in FIG. 2B, a tab 230 is provided to allow for selecting the visual identifier 220. FIG. 2C illustrates the housing 210 having a turn knob 240 as a selecting mechanism. Apertures 250 may be part of the turn knob and may be configured to permit an audible signal to pass through for purposes to be described below. It will become apparent that other selection mechanisms may be provided that include, for example, liquid crystal displays, buttons, actuators, and other forms of housings 210. Instead of a single thumbwheel, for example, visual identifier devices 150 with two or more thumbwheels may be used.

Using a selection mechanism of the visual identifier device 150, a network operator is able to select a visual identifier 220 from a group of visual identifiers 220 provided by the device 150. For example, the network operator may turn the knob 240 shown in FIG. 2C to select the visual identifier 220 from a group of visual identifiers 220.

In FIGS. 2A through 2C, the visual identifier 220 is shaded to represent a color. Thus, the visual identifiers 220 may be in the form of different colors from which a network operator may select. Each network device 145 or node 130 may be associated with a particular color. Colors are easily observable and allow network operators to conveniently match the visual identifier devices 150 with corresponding icons shown on a display used by the operator, as discussed below.

Any other suitable form of visual identifier 220 may be used to identify the network devices 145 or nodes 130. For example, the visual identifiers 220 may be in the form of small pictures or icons of objects such as different fruits, vegetables, card suites, animals, vehicles, or other suitable images associated with the nodes 130 or network devices 145.

In larger networks 110, the visual identifiers 220 may be in the form of a combination of colors or other visual indicators. For example, a node 130 may be associated with the visual identifier 220 of "Red and Green," and another node 130 could have the combination "Red and Red," for devices 150 having two thumbwheels. Visual identifier devices 150 can be made to look like small slot machines that can be adjusted to select a desired visual identifier 220, e.g., Lemon and Lemon, Apple and Lemon, etc.

The visual identifier devices 150 may also be configured to validate selected visual identifiers 220 to ensure that another network device 145 is not already using a particular selected visual identifier 220. This may be performed by sending messages between the nodes 130 of the network 110, as discussed further below. If it is determined that a selected visual identifier 220 is already in use, the visual identifier devices 150 may be configured to notify network operators of such a situation. On the other hand, if it is determined that a selected visual identifier 220 is not already in use, the visual identifier devices 150 may be configured to notify network operators of such a situation with a different notification (e.g., a sound or light sequence). In this manner, the visual identifier devices 150 assist network operators in the introduction of network devices 145 to the network 110. Although not preferable, some embodiments may be configured to allow the same visual identifier 220 to be used for more than one node 130 or network device 145.

With the features described above, the visual identifier devices 150 enable network operators to conveniently introduce new network devices 145 into the network 110. In many cases, for example, it may be difficult for network operators to remember whether a given visual identifier 220 is already in use by another network device 145. To illustrate, someone (i.e., a network operator) may wish to introduce a new network device 145, e.g., a doorbell button into the network 110. The doorbell button may be affixed adjacent to a door. Now, the network operator uses the visual identifier device 150 to select a visual identifier 220 to be assigned to the doorbell button. It would be inconvenient for the network operator to have to walk to the network management application 170 at another node 130 to determine which visual identifiers 220 are not already in use. Instead, the visual identifier device 150 allows the network operator to select any visual identifier 220 from a set of visual identifiers 220. The visual identifier device 150 may then communicate with other visual identifier devices 150 or the network management application 170 to determine whether a selected visual identifier 220 is already in use. If it is not already in use, the network device 145 has been successfully added to the network 110. The visual identifier device 150 then notifies the network operator of success. Alternatively, if the visual identifier 220 is already in use, the visual identifier device 150 may notify the network operator using a different signal. In this fashion, a visual identifier 220 may be selected until one is found that is not already in use by another network device 145. This provides an easy way to introduce a new network device 145 to the network 110.

The visual identifier device 150 may be configured to provide notifications in a wide variety of ways. For example, a light emitting diode may be configured to illuminate in a certain pattern to indicate success and in a different pattern to indicate that the visual identifier 220 is already in use.

Instead of a light, any other suitable notification technique may be used. For example, the displays or lights of network devices 145 can be used. Alternatively, sounds or other indicating mechanisms may be used. As mentioned above, the visual identifier device 150 shown in FIG. 2C may include apertures 250 for passing sound. Thus, different sounds may be used to signal network operators. Alternatively, the notification may be indicated by another device in the network 110. For example, the notification may be provided as an audible signal from the network device 145-1 (e.g., from a computer at node 130-1) or as a visible message on the display device 160.

The visual identifier devices 150 are configured to map selected visual identifiers 220 to the corresponding network devices 145 so that the selected visual identifiers 220 may be used to identify the network devices 145. In particular, upon selection of a visual identifier 220, any particular visual identifier device 150 may transmit information representative of selected visual identifier 220 to the network management application 170, which may display a representation of the visual identifier 220 for viewing by network operators. Accordingly, visual identifiers 220 may be used in place of traditional addresses to enable convenient identification and location of network devices 145. Network operators may readily determine which network device 145 is associated with a particular visual representation of a visual identifier 220 shown on a network management display.

F. Display

Figure 3:
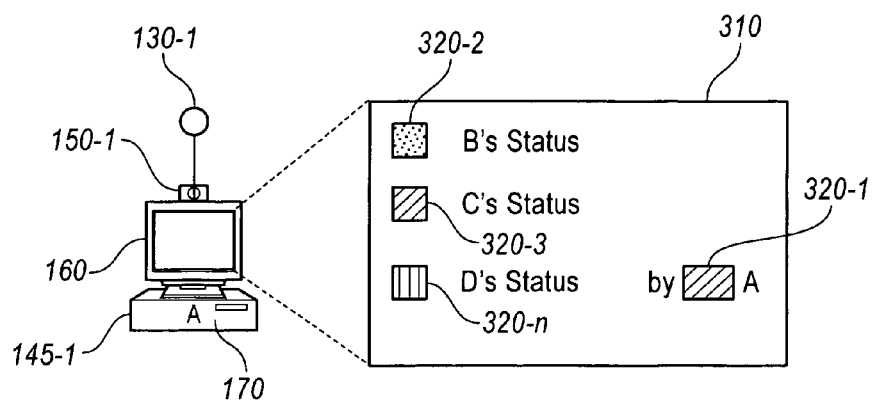
FIG. 3 is a block diagram illustrating an example of a display generated by the network management system of FIG. 1, according to one embodiment.

FIG. 3 illustrates an example of a network management display 310 generated by the display device 160 and network management application 170 of network device 145-1. The network management display 310 is configured to display visual representations 320-1 through 320-n (collectively "the visual representations 320") of visual identifiers 220. In FIG. 3, the visual representations 320 are in the form of different shading, which is meant to be representative of different colors. Of course, any other form of visual identifier 220 may also have its visual representation 320 displayed. For example, the visual representations 320 may be in the form of icons or pictures.

Much fancier visual representations 320 can be employed than those described above. Manufacturers may like to show a high quality image of the product on the network management display 310, instead of a little colored square. This could be easily accommodated, so long as there is some aspect of the visual representation that can be made to correspond to the visual identifier 220 so that different visual identifiers 220 are distinguishable from one another. The basic idea is that the display 310 provides a visual representation 320 of the visual identifier 220 associated with a node 130 in a manner that allows network operators to easily identify and locate the node 130 using the visual identifier 220. In some embodiments, the management display 310 may be configured to display the visual representations 320 in a map of the network 110.

Figure 4:
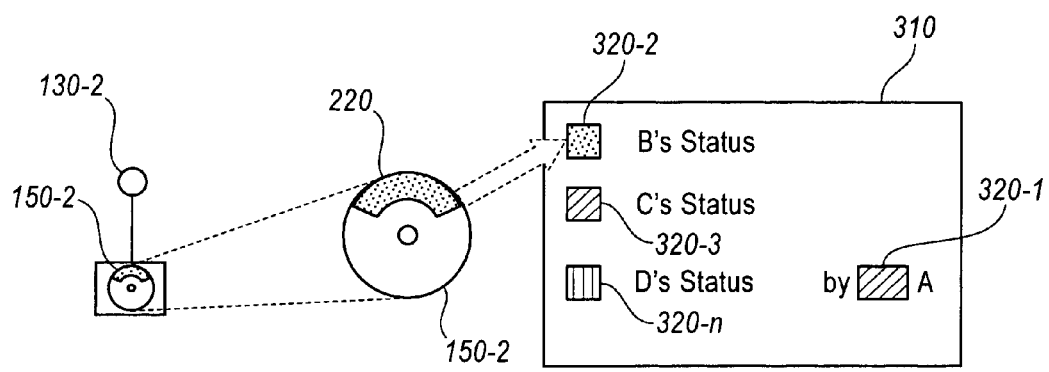
FIG. 4 is a block diagram illustrating the presentation of visual representations of visual identifiers on the display of FIG. 3, according to one embodiment.

FIG. 4 illustrates the correspondence between the visual identifier 220 associated with node 130-2 and the visual representation 320-2 shown on the network management display 310. Whatever color is selected on the device 150 will be used on the management display 310 to represent that particular node 130-2 with a visual representation 320-2. Thus, if a network operator colors a network device 145 blue, for example, that corresponding visual representation 320 will turn blue on the management display 310. In this fashion, the network operator can very easily set the visual identifier 220 for a node 130 or network device 145, and affect how it is shown on the management display 310. Then he or she can look at the management display 310, and easily find the physical node 130 or network device 145 that corresponds to a given visual representation 320.

As shown in FIGS. 3 and 4, the visual representations 320 may be associated with status information for the corresponding nodes 130 and/or network devices 145. This allows network operators to view the status information, identify any problems, and easily identify the node 130 or network device 145 associated with the problem. The network operators may then physically locate the node 130 or network device 145 using the visual identifier 220 associated therewith.

Figure 5:
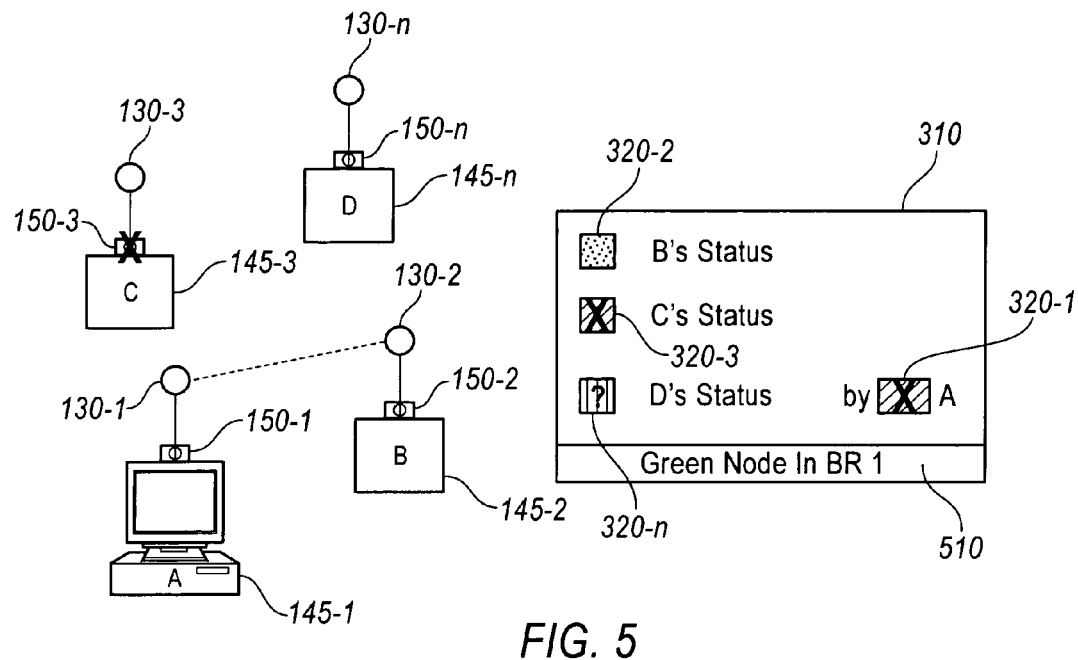
FIG. 5 is a block diagram illustrating an example of operation of the system of FIG. 1, according to one embodiment.

FIG. 5 illustrates the use of the system 100 in normal network operation. Here, for example, network device 145-3 has failed, perhaps because its batteries have been exhausted. As a result, network device 145-n is no longer in communication with the network 110. The network operator can check the management display 310 and determine that the "green" network device, which we term network device 145-3 has failed, and that the "red" network device 145-n can no longer be reached because it required a relay through the "green" network device 145-3. The network operator can go through the house and find the "green" network device 145-3 by visually inspecting the respective visual identifier devices 150. The network operator may then replace the batteries of the network device 145-3. To make it even easier, there may be a small text field 510 on the management display 310 that the network operator can type into, so the network operator could put in a brief note next to the "green" network device 145-3 or node 130-3, thereby reminding himself or herself that it is located in Bed Room 1, for example.

The visual representations 320 can be used in other ways than simply being displayed on the management display 310. For example, when a battery of a network device 145 is getting low, the management system 100 may send a notification (e.g., an e-mail message) to the network operator. The email may contain a visual representation 320 of the visual identifier 220 associated with the failing device 145.

Figure 6:
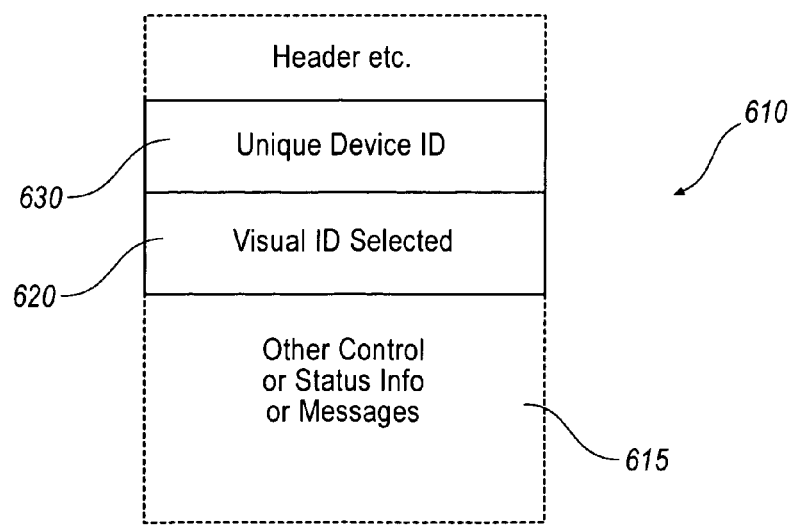
FIG. 6 is a block diagram illustrating an example of visual identifier information in a message suitable for transmission between the nodes of the system of FIG. 1, according to one embodiment.

FIG. 6 illustrates an example of a form of messages 610 suitable for transmission between the nodes 130 of the system 100. The messages 610 may be in the form of packets having a header portion and a data portion 615. As shown in FIG. 6, the messages 610 may include visual identifier information 620 and unique device identifier information 630. The messages 610 provide a very simple way in which devices 145 may transmit visual identifier information 620 to other devices 145 and/or the network management application 170. The network identifier information 620 may have an assigned field in the message 610 so that devices 145 can readily interpret the information.

Preferably, every node 130 or network device 145 has a unique device identifier (e.g., a WiFi identifier). The message 310 contains both the unique device identifier information 630 and the visual identifier information 620. The visual identifier field may contain the number one to indicate red, the number two to indicate yellow, and so forth. When the network management application 170 receives such messages 610, it can readily map between important status and control information 615, which is generally based on the unique device identifier information 630, or on an IP address which in turn is based on the unique device identifier information 630. The network management application 170 is further configured to use the visual identifier information 620 to determine the visual identifier to be used when depicting the corresponding node 130 on the management display 310.

The messages 610 are helpful for determining whether a visual identifier 220 is being used by another device 145 in the network 145. Each node 130 or network device 145 may be configured to inspect the messages 610 to determine whether their own visual identifier 220 is currently in use by another node 130 or network device 145. This may be accomplished by determining whether a message 610 contains the same visual identifier 620 but a different unique device identifier 630. As discussed above, the system 100 may notify the network operator of duplicate use of the same visual identifier 220 at multiple nodes 130. Any suitable form of notification may be used.

III. Process Flow Views

Figure 7:
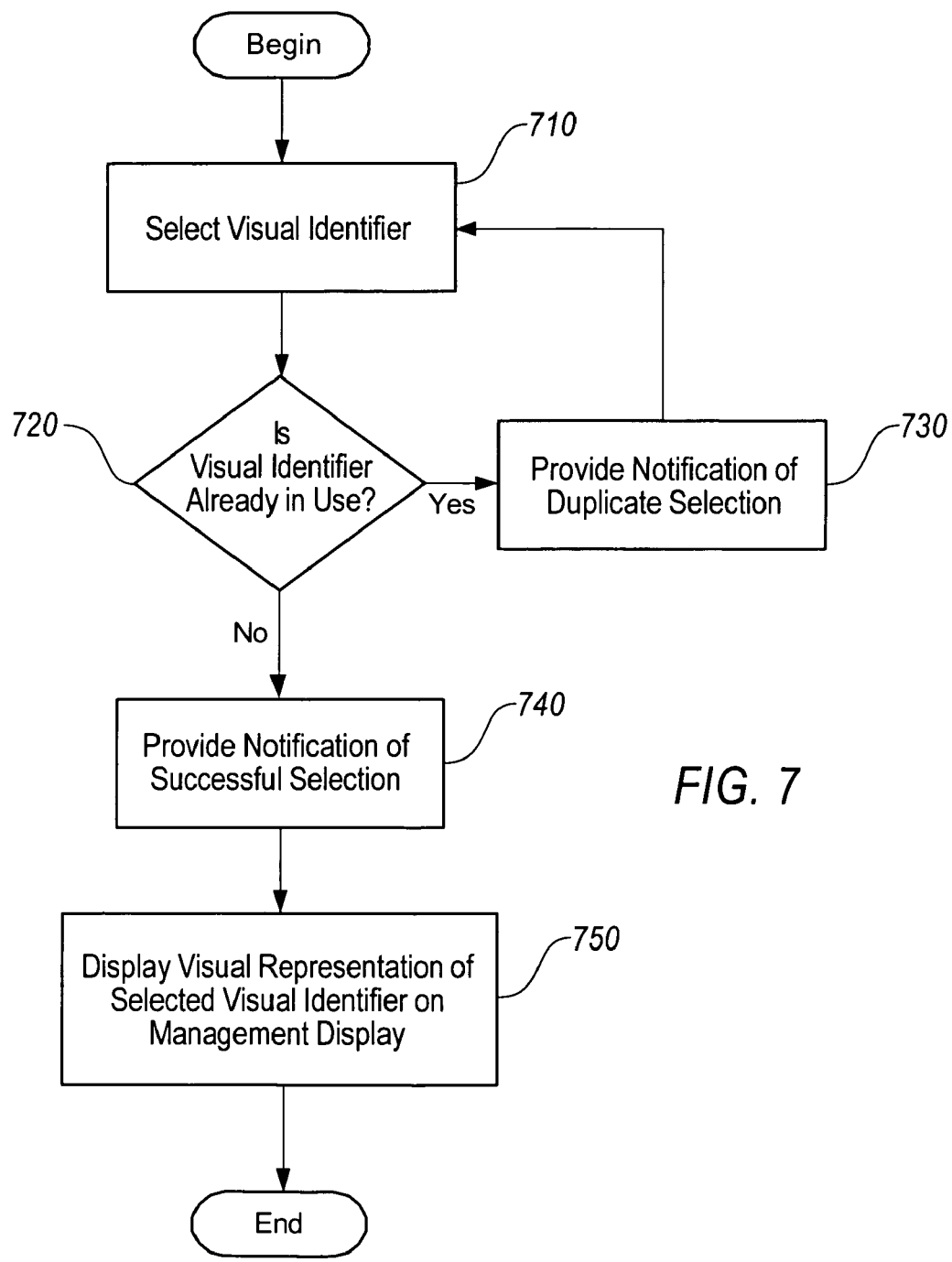
FIG. 7 is a flowchart illustrating an example of a method for introducing a network device into the system of FIG. 1, according to one embodiment.

FIG. 7 illustrates an example of a method for introducing a network device 145 into the network 110, according to one embodiment. While FIG. 7 illustrates exemplary steps according to one embodiment, other embodiments may omit, add to, and/or modify any of the steps shown in FIG. 7.

The process of FIG. 7 begins at step 710, at which step the network operator selects a visual identifier 220 for a network device 145. Step 710 may be performed using the visual identifier device 150 as discussed above. For example, step 710 may comprise selecting a color as the visual identifier 220.

At step 720, a determination is made with regard to whether or not selected visual identifier 220 is already in use by another network device 145. Step 720 may be performed as described above, including by inspection of a message 610 sent by the network device 145.

If it is determined that the selected visual identifier 220 is already in use, the process advances to step 730, at which step the visual identifier device 150 provides a notification to the network operator. The notification may be in any of the forms described above, including sound or light patterns. The process then returns to step 710, at which step the network operator may select another visual identifier 220.

On the other hand, if it is determined that the selected visual identifier 220 is not already in use, the process advances to step 740, at which step the visual identifier device 150 provides a different notification to the network operator as an indication that the network device 145 has been successfully added to the network 110. Again, the notification may be in any of the forms described above.

At step 750, a visual representation 320 of the selected visual identifier 220 is displayed on the management display 310 for viewing by the network operator.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A network management system, comprising:
a visual identifier device located visibly proximate to a network device, said visual identifier device including a set of visual identifiers and a selector mechanism configured to be manipulated to select at least one of said visual identifiers to be assigned to the network device; and
a display device configured to display a visual representation of said selected visual identifier.

2. The system of claim 1, wherein said display device and said visual identifier device are located at different nodes of a network, said visual identifier device being configured to transmit information representative of said selected visual identifier to the node associated with the display device.

3. The apparatus of claim 2, wherein said information includes said visual representation of said selected visual identifier.

4. The system of claim 1, wherein said set of visual identifiers comprises a plurality of different colors.

5. The system of claim 1, wherein said set of visual identifiers comprises a plurality of distinguishable images.

6. The system of claim 1, wherein said selector mechanism comprises a housing or a turn knob configured to be rotated to select said one of said visual identifiers.

7. The system of claim 1, wherein said selector mechanism comprises a sliding actuator.

8. The system of claim 1, wherein said visual identifier device is configured to provide a failure notification indicative of said selected visual identifier already being in use in a network.

9. The apparatus of claim 8, wherein said visual identifier device is configured to provide a success notification indicative of said selected visual identifier being available in the network.

10. The apparatus of claim 9, wherein said failure notification and said success notification comprise distinguishable sound or light patterns.

11. An apparatus for management of a network, the apparatus comprising:
a set of visual identifiers; and
a selector mechanism configured to be manipulated to select at least one of said visual identifiers to be assigned to a network device, said selected visual identifier being located visibly proximate to the network device.

12. The apparatus of claim 11, wherein said set of visual identifiers comprises a plurality of different colors.

13. The apparatus of claim 11, wherein said set of visual identifiers comprises a plurality of distinguishable images.

14. The apparatus of claim 11, wherein said selector mechanism comprises a housing or a turn knob configured to be rotated to select said one of said visual identifiers.

15. The apparatus of claim 11, wherein said selector mechanism comprises a sliding actuator.

16. The apparatus of claim 11 further comprising a communication mechanism for transmitting information representative of said selected visual identifier over the network to a network management application.

17. The apparatus of claim 16, wherein said information includes a visual representation of said selected visual identifier, said visual representation being configured for display.

18. The apparatus of claim 11, further comprising a notification mechanism for providing a failure notification indicative of said selected visual identifier already being in use in the network.

19. The apparatus of claim 18, wherein said notification mechanism is configured to provide a success notification indicative of said selected visual identifier being available in the network.

20. The apparatus of claim 19, wherein said failure notification and said success notification comprise distinguishable sound or light patterns.

21. A method of introducing a network device into a network, the method comprising:
- providing a visual identifier device, said visual identifier device offering a set of visual identifiers from which one of said visual identifiers may be selected to be assigned to the network device;
- recognizing said selected visual identifier and associating it with the network device;
- determining whether said selected visual identifier is already in use by another network device of the network; and
- providing a failure notification and an opportunity to select another one of said visual identifiers if it is determined that said selected visual identifier is already in use.

22. The method of claim 21, wherein said one of said visual identifiers may be selected by manipulating a selector mechanism of said visual identifier device.

23. The method of claim 21, wherein said determining step includes:
- sending a message over the network, said message including information representative of said selected visual identifier; and
- comparing said information with said visual identifiers being used by other network devices of the network.

24. The method of claim 21, further comprising providing a success notification to the network operator if it is determined that said selected visual identifier is available.

25. The method of claim 24, wherein said failure notification and said success notification are provided in the form of distinguishable sound or light patterns.

26. The method of claim 21, further comprising displaying a visual representation of said selected visual identifier on a network management display.

* * * * *